US010387425B1

(12) United States Patent
Jenkins et al.

(10) Patent No.: US 10,387,425 B1
(45) Date of Patent: Aug. 20, 2019

(54) PRESERVING TEMPORAL LOCALITY WHILE MULTIPLEXING STREAMS IN A STREAM-INFORMED SEGMENT LAYOUT (SISL) SYSTEM

(71) Applicant: EMC IP Holding Company LLC, Hopkinton, MA (US)

(72) Inventors: Fani Jenkins, Broomfield, CO (US); Sudhanshu Goswami, Fremont, CA (US); Mahesh Kamat, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 394 days.

(21) Appl. No.: 15/198,140

(22) Filed: Jun. 30, 2016

(51) Int. Cl.
*G06F 16/2455* (2019.01)
*G06F 11/14* (2006.01)

(52) U.S. Cl.
CPC .... *G06F 16/24568* (2019.01); *G06F 11/1453* (2013.01); *G06F 11/1464* (2013.01); *G06F 2201/84* (2013.01)

(58) Field of Classification Search
None
See application file for complete search history.

(56) References Cited

U.S. PATENT DOCUMENTS

| | | | | |
|---|---|---|---|---|
| 2005/0246510 | A1* | 11/2005 | Retnamma | G06F 11/1464 711/162 |
| 2006/0294125 | A1* | 12/2006 | Deaven | H04N 19/46 |
| 2012/0233417 | A1* | 9/2012 | Kalach | G06F 11/1453 711/162 |
| 2013/0275696 | A1* | 10/2013 | Hayasaka | G06F 3/0608 711/162 |

OTHER PUBLICATIONS

Dirk Meister, Jurgen Kaiser, André Brinkmann; Block Locality Caching for Data Deduplication, 2013 (Year: 2013).*

* cited by examiner

*Primary Examiner* — James Trujillo
*Assistant Examiner* — John J Morris
(74) *Attorney, Agent, or Firm* — Staniford Tomita LLP

(57) ABSTRACT

Embodiments are directed to a method for preserving temporal locality in disk-based backup systems by receiving a plurality of save streams each comprising a data stream and a metadata stream, directing the data streams to a plurality of respective data containers, and the metadata streams to a single shared metadata container, and assigning metadata streams using the shared metadata container to their own respective compression region to preserve locality at the compression region level.

16 Claims, 5 Drawing Sheets

US 10,387,425 B1

PRESERVING TEMPORAL LOCALITY WHILE MULTIPLEXING STREAMS IN A STREAM-INFORMED SEGMENT LAYOUT (SISL) SYSTEM

TECHNICAL FIELD

Embodiments are generally directed to stream-based data backups, and more specifically to saving metadata streams in shared NVRAM containers and preserving temporal locality at the region level.

BACKGROUND

Although tape has long been the dominant storage medium for data protection in large-scale data storage systems, such systems are being increasingly supplanted by disk-based deduplication systems. Deduplication can deliver an order of magnitude greater data reduction than traditional compression over time, which would imply that a deduplication system needs fewer disks and that the configured costs of a disk storage system are comparable to tape automation. However, it has been observed that deduplication systems use a lot more disks than expected due to their disk-intensive nature. The conventional way to increase system performance is to use more disks and/or to use faster, more expensive disks. Unfortunately, using this approach in a deduplication array can quickly make it more expensive than a tape library. It could also mean a waste of capacity since each disk comes with a lot of space, and adding disks for better I/O performance require paying more for unnecessary capacity.

To solve this problem, a Stream-Informed Segment Layout (SISL) architecture has been developed within certain deduplication storage systems such as the Data Domain Operating System (DDOS) by EMC Corporation. SISL optimizes deduplication throughput scalability and minimizes disk footprints by minimizing disk accesses. This allows the system throughput to be CPU-centric and speed increases can be realized as CPU performances increase. Deduplication involves breaking an incoming data stream into segments in a repeatable way and computing a unique fingerprint for the segment. This fingerprint is then compared to all others in the system to determine whether it is unique or redundant so that only unique data is stored to disk. To clients, the system appears to store the data in the usual way, but internally it does not use disk space to store the same segment repeatedly. Instead, it creates additional references to the previously stored unique segment. In a scalable deduplication system, fingerprints need to be indexed in an on-disk structure. To achieve speed, the system needs to seek to disk to determine whether a fingerprint is unique or redundant. SISL includes a series of techniques that are performed inline in RAM prior to storage to disk for quickly filtering new unique segments and redundant duplicate segments. In SISL, new data segments for a backup stream are stored together in units called localities that, along with their fingerprints and other metadata, are packed into a container and appended to the log of containers. The fingerprints for the segments in the localities are kept together in a metadata section of the container, along with other file system structural elements. This keeps fingerprints and data that were written together close together (maintains locality) on disk for efficient access during writes when looking for duplicates and during reads when reconstructing the deduplicated stream.

The number of write streams supported in a deduplication backup system is mainly enforced on the basis of memory resources available on the server. To increase the number of streams, the amount of resources needs to be increased or they need to be utilized more efficiently. In present systems, each data stream takes one container to preserve locality of the data. Current systems typically use NVRAM (non-volatile RAM) into which data streams are written before they are committed to disk. This provides faster response time for client operations because it allows data to be written asynchronously before a disk write process, which takes longer. However, NVRAM is limited in that it can only support a certain number of streams, that is, the NVRAM configuration (available size) limits the number of concurrent streams for user data and metadata for the file. Thus, the capacity of NVRAM represents a bottleneck in the system with regard to how many streams can be concurrently processed in the backup system. Optimizing the use of NVRAM requires minimizing the number of containers. For example, in present systems, each data stream and associated metadata stream uses one container each. Reducing the number of containers required would increase the efficiency of NVRAM usage.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
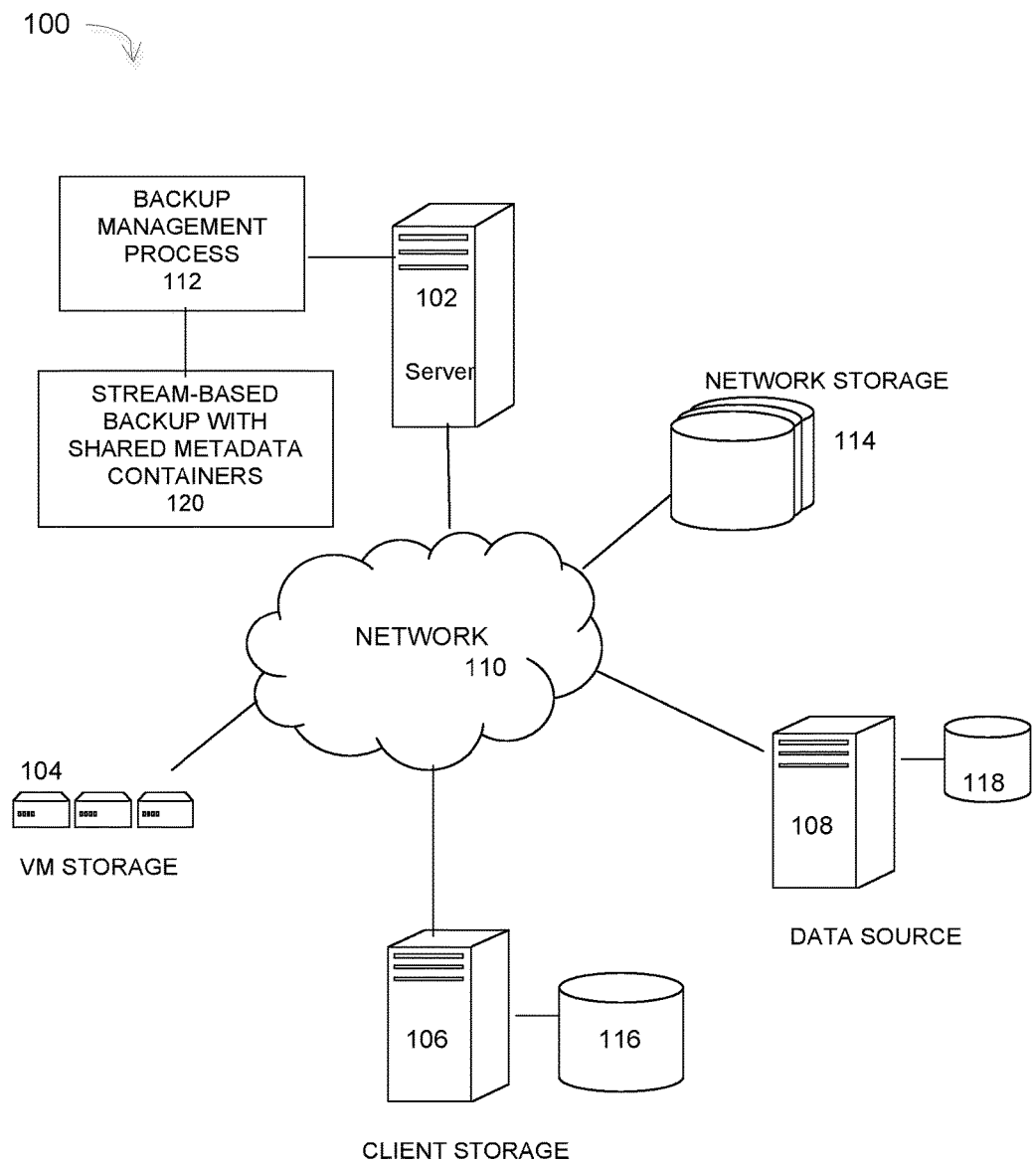
FIG. 1 is a diagram of a large-scale network implementing a stream-based backup process using shared metadata containers and having temporal locality preservation, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated backup recovery techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 illustrates a computer network system 100 that implements one or more embodiments of a large-scale network implementing a stream-based backup process, under some embodiments. In system 100, a backup server 102 executes a backup management process 112 that coordinates or manages the backup of data from one or more data sources 108 to storage devices, such as network storage 114, client storage 106, and/or virtual storage devices 104.

The data sourced by the data source 108 may be any appropriate data, such as database data that is part of a database management system used in enterprise-scale network systems. In this case, the data may reside on one or more hard drives (e.g., 118) and may be stored in a variety of formats in the database or other storage mediums. Examples include an Extensible Markup Language (XML) database that is a data persistence software system that allows data to be stored in XML format, or a relational database management system (RDMS) that uses tables to store the information. Computer 108 may represent a database server that instantiates a program that interacts with the database or a similar server computer.

A network server computer 102 is coupled directly or indirectly to other network resources, such as storage devices 114, VMs 104, clients 106, and data sources 108 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud-computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client storage, server storage (e.g., 118). The backup process 112 causes or facilitates the backup of this data to other storage devices of the network, such as network storage 114, which may at least be partially implemented through storage device arrays, such as RAID components.

For the embodiment of FIG. 1, network system 100 includes a server 102 that executes a data backup process, which may represent a Data Domain Restorer (DDR)-based deduplication storage process so that server 102 may be implemented as a DDR Deduplication Storage server provided by EMC Corporation. However, other similar backup and storage systems are also possible. The DDR process breaks the incoming data stream into segments in a repeatable way and computes a unique fingerprint for the segment that is compared to all others in the system to determine whether it is unique or redundant. In certain embodiments, the Data Domain deduplication technology uses a relatively small segment size (8 KB average, varying in size). In an embodiment, server 102 that executes a data backup process with a functional component 120 that implements a stream-based backup process having temporal locality preservation using shared metadata containers. Such a backup process may comprise SISL technology.

Figure 2:
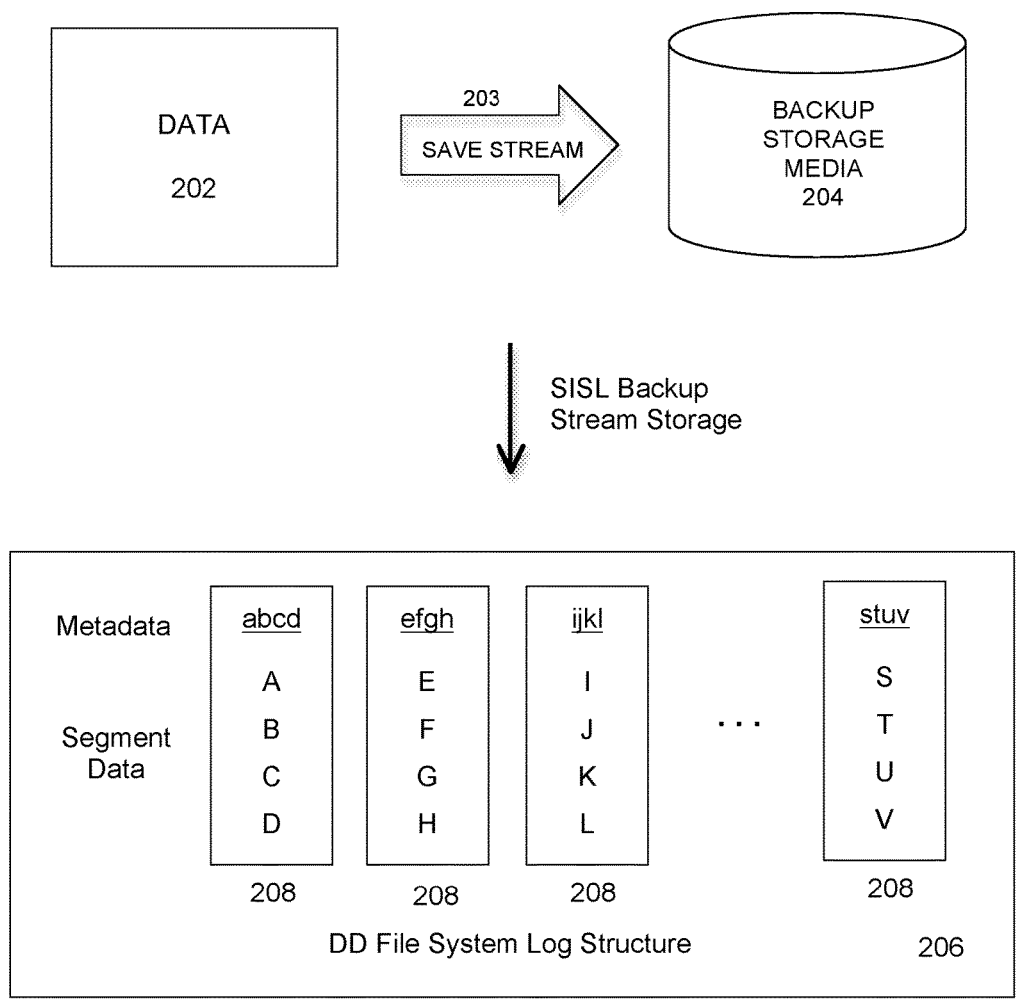
FIG. 2 illustrates a basic SISL backup method that is adapted for use in a shared metadata container scheme, under some embodiments.

FIG. 2 illustrates a basic SISL backup method that is adapted for use with a shared metadata container and temporal locality preservation scheme, under some embodiments. As shown in FIG. 2, in a traditional single stream process, a set of data 202 to be backed up is saved to backup storage media 204 in a single save stream 203. SISL includes a series of techniques performed inline in RAM, prior to data storage to disk, for quickly filtering both new unique segments and redundant duplicate segments: the summary vector and segment localities. The summary vector is an in-memory data structure used by the backup system operating system (e.g., DDOS) to quickly identify new, unique segments. Identifying new segments saves the system from doing a lookup in the on-disk index only to find the segment is not there. The summary vector is a bit array in RAM initially set to all zeros. When a new segment is stored, a few bit locations in the array are set to 1. The locations are chosen based on the fingerprint of the segment. When a subsequent segment arrives, its chosen locations are checked. If any locations are 0, the system knows conclusively that the segment has not previously been stored, and it can stop looking. To improve disk efficiency it is important to retrieve many segments with each access. Generally a given small segment of data in most backups will tend to be stored sequentially with the same neighboring segments before it and after it most of the time. The Data Domain system stores these neighbors together as sequences of segments in units called segment localities, which are packed into containers. The Data Domain file system is a log-structured system, at the heart of which is the log of containers storing localities. A locality keeps segments close together on disk when they are neighbors. The system can access all the fingerprints or a whole locality with a single disk access. This means many related segments or segment fingerprints can be accessed very efficiently.

New data segments for a backup stream are stored together in units called localities that, along with their fingerprints and other metadata, are packed into a container and appended to the log of containers. The fingerprints for the segments in the localities are kept together in a metadata section of the container, along with other file system structural elements. This keeps fingerprints and data that were written together close together on disk for efficient access during writes when looking for duplicates and during reads when reconstructing the deduplicated stream. Thus, as shown in the example embodiment of FIG. 2, for the SISL backup process, a file system log structure 206 is created wherein the segment data, e.g., blocks ABCD, EFGH, IJKL, so on up to STUV are stored along with respective metadata elements abcd, efgh, ijkl, so on up to stuv. Each block of data and associated metadata is written to a container 208, which is the data structure that is written to disk. In present systems, the metadata (which contains references to data in the container) is written to the top of the container so that data and the associated metadata are written to the same container. This association of data and metadata in the same container maintains temporal locality since the data and other associated data (metadata) are written together.

In present systems, to maintain the SISL architecture, a segment store process associates a container with a stream for incoming data. Each user stream is divided into two streams, one for data and another for metadata, thus requiring two containers for each user stream. Each one of these containers also requires NVRAM, which in an example is divided into 1 Mb blocks that are picked up by containers as needed. In this example, each container is 4.5 Mb in size, thus requiring up to 5 NVRAM blocks per container. While data is being written to containers across all the open streams, each container on an average is half full. Two containers per stream require 2×2.5 Mb worth of NVRAM on an average at any given point. So each user stream requires about 5 Mb of NVRAM on an average. The amount of NVRAM, which is typically a limited resource, decides the number of write streams that a backup server (e.g., DDR) can support. To increase the number of write streams that can be processed, this NVRAM needs to be used more efficiently.

As stated above, currently each stream uses NVRAM to write user data and the metadata for the file. The data stream and metadata streams use one container each, and each container being written to manages its own NVRAM. It allocates 1 MB NVRAM blocks as it fills data within the container. When the container is full, it occupies 5 NVRAM blocks. These blocks are freed after the container has been written down to disk. To ensure that disk bandwidth is utilized optimally, as each container gets full it is written down to disk immediately, and corresponding NVRAM blocks are immediately freed. In present systems, a whole container is allocated for stream metadata. However, the amount of metadata that is written for each file is much smaller than the user data being written. In order to make NVRAM usage more efficient, a metadata container sharing arrangement is implemented instead of provisioning a whole container and corresponding NVRAM for metadata being written through each metadata stream. In an embodiment, the system shares metadata containers across streams, and thus reduces the total number of metadata containers needed in the system. Once the number of metadata containers is reduced, the NVRAM that was being used by those metadata containers is freed up to be used for increasing the number of streams, as long as the system also increases the memory used for those new streams.

Figure 3:
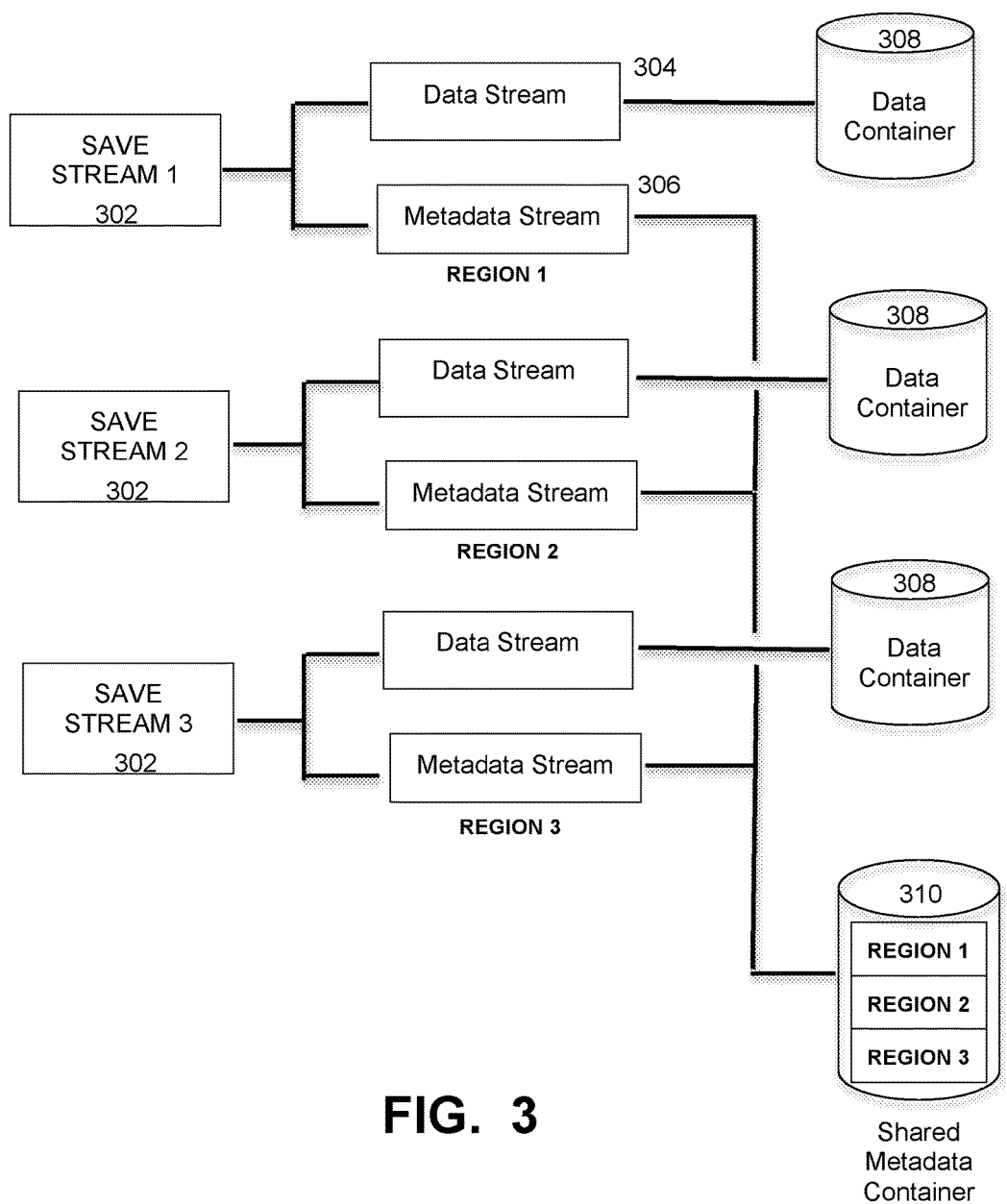
FIG. 3 illustrates a metadata container sharing scheme under some embodiments.

In an embodiment, process 120 includes a structure that shares metadata containers such that data streams are written to their own respective data containers, while metadata streams are written to a shared metadata container. FIG. 3 illustrates a metadata container sharing scheme under some embodiments. As shown in FIG. 3, three example save streams 302 containing data and metadata are separated into their constituent data streams 304 and metadata streams 306. Each data stream is saved to a respective data container 308, while the metadata streams 306 are saved to a single shared metadata container 310. Each save stream represents a different region denoted Region 1, Region 2, Region 3, and the metadata is organized to store metadata from each region in a respective location in the metadata container 310, as shown. The example of FIG. 3 illustrates three save streams 302, but embodiments are not so limited. Any practical number of save streams and data containers may be used depending on system configuration, and any practical ratio of data containers to metadata containers may be used, for example there may be 100 or several hundreds of data streams for every one shared metadata stream, based on a ratio of 1000 data words for each metadata word in each save stream.

For the embodiment of FIG. 3, each save stream is separated into the constituent data and metadata streams. The data streams are sent to their respective data containers. The metadata streams are combined and then multiplexed into a single metadata stream that is sent to the shared metadata container.

Figure 4:
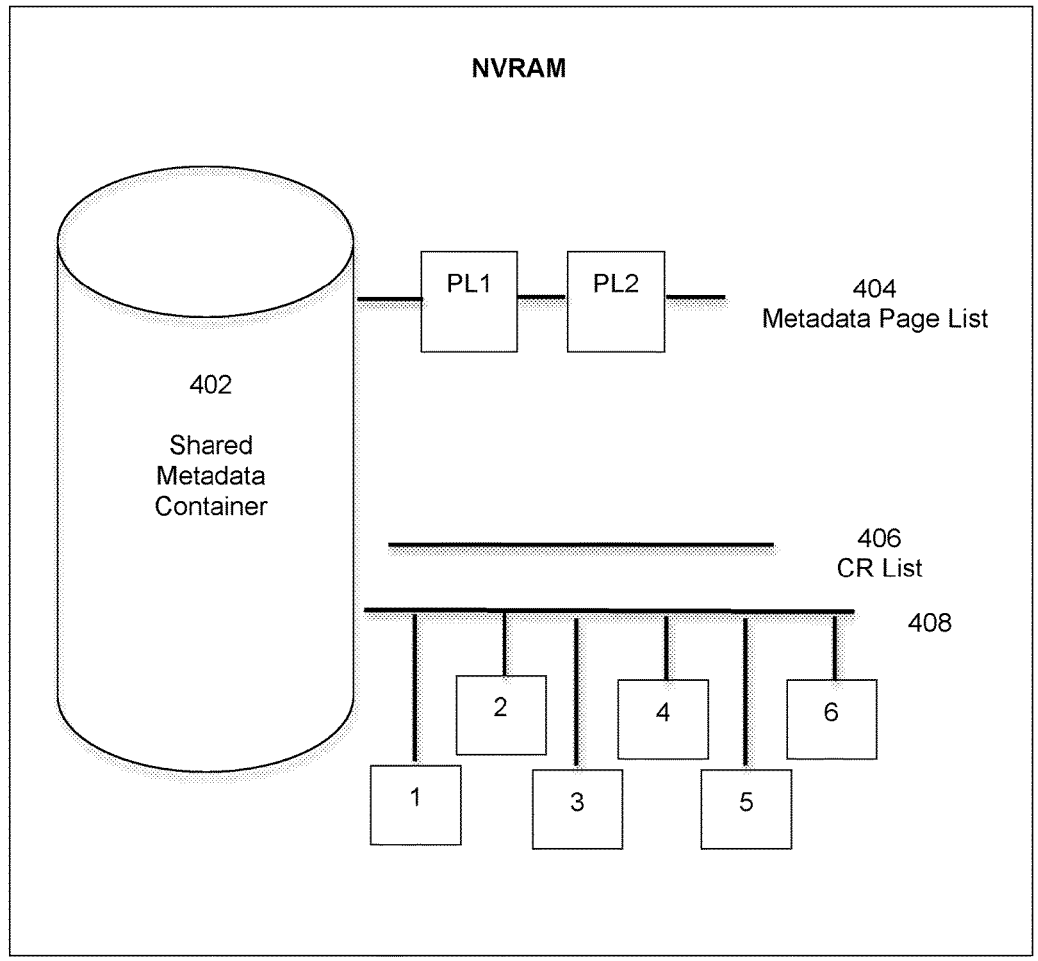
FIG. 4 illustrates a shared metadata container that maintains region level locality under some embodiments.

FIG. 4 illustrates a shared metadata container that maintains compression region level locality under some embodiments. As shown in FIG. 4, shared metadata container 402, which in an example implementation may hold on the order of 4.5 MB of metadata, comprises a metadata page list 404, a compression region (CR) list 406, and separate page list and compression regions 408.

The shared metadata container 402 holds metadata for the metadata streams that are essentially multiplexed together to fill the metadata container. If the metadata is simply written to a single page list, metadata from different regions would intermingle, thus destroying temporal locality. To maintain this temporal locality in which one region is assigned to one stream only, each metadata stream gets its own page list. That is, each metadata stream gets its own page list and a data structure is maintained in memory that associates each page list with the metadata that is stored in the shared metadata container. In this way, temporal locality of the metadata streams with respect to their respective regions is maintained, and the fact that the metadata streams are all shared in a single container, for a large multiple of data streams means that the number of containers required is significantly reduced over systems that maintain one container for each metadata stream along with one container for the associated data stream.

In an embodiment, each metadata stream that shares a metadata container gets assigned its own compression region in order to preserve locality at the compression region level, and this compression region is implemented using a page list of data pages. The format of such a page list may be in any appropriate format or configuration depending on the particular implementation required for a given system configuration, and certain optimization techniques for page list maintenance may also be used.

The shared metadata container mechanism illustrates a form of dynamically managing the number of metadata containers in the backup system 100. For the embodiment described above, the shared metadata container is generated by multiplexing different metadata streams to a single shared container. When an original shared container is filled, a second container may be created and used, and so on until a sufficient number of shared containers are allocated. In an alternative embodiment, the shared metadata container may be generated through a metadata container merge scheme. In this embodiment, as long as the number of streams stays below the currently supported stream counts each stream should be able to get one data and one metadata container each. After it exceeds the current limits, it shifts NVRAM usage from metadata containers to data containers. This is done by merging two metadata containers and creating a new data container in place of the merged metadata container reduced in this process. The metadata streams will share metadata containers after this point, and the metadata container or containers will be limited to a certain number based on how many write streams are open at that point of time.

With dynamic management of multiple shared metadata containers, the system defines a threshold maximum number of streams (e.g., 1080 streams). When this threshold is reached it will start sharing metadata containers across streams, to make space for incoming streams. So, after the next user stream arrives (e.g., stream 1081), instead of this stream claiming the oldest container in the system for its data and metadata streams, it will trigger one other metadata container to merge with another metadata container, and take over the vacated slot for its own data container. For its metadata stream, it will find another metadata container and share that with its other owner. To reduce metadata containers to create a new data container, a merge process merges two metadata containers with each other, and then directs the metadata streams to fill the reduced metadata containers. In this embodiment, the system maintains a count of metadata containers so that it does not go below the minimum number of metadata containers.

In the case of sharing metadata container it is generally important to spread metadata streams uniformly across all the metadata containers. To maintain uniform sharing of metadata containers, the system keeps all metadata containers in a separate double-ended queue. Each metadata container also maintains a reference count indicating the number of streams that are sharing that container. At the same time it keeps track of the number of write streams that are open. Using these two factors, the average number of streams per container is calculated. One end of the double-ended queue maintains metadata containers that are being shared by number of streams less than the average streams per container. The other end maintains containers that are being shared by number of streams greater than or equal to the average number of streams per container. When a stream wants to pick up a new metadata container, it can create a new metadata container if it is below a metadata sharing watermark value. If it is above this value it will pick up a container from the end of the queue that has containers being shared by fewer streams. After picking the metadata container if the number of streams sharing the metadata container goes above the average number of streams per metadata container, it will be moved to the other end of the queue. Similarly, when a stream closes, if the number of streams sharing a container goes below the average number of streams per metadata container, that stream will be moved to the end of the queue that contains containers with fewer streams sharing it.

Figure 5:
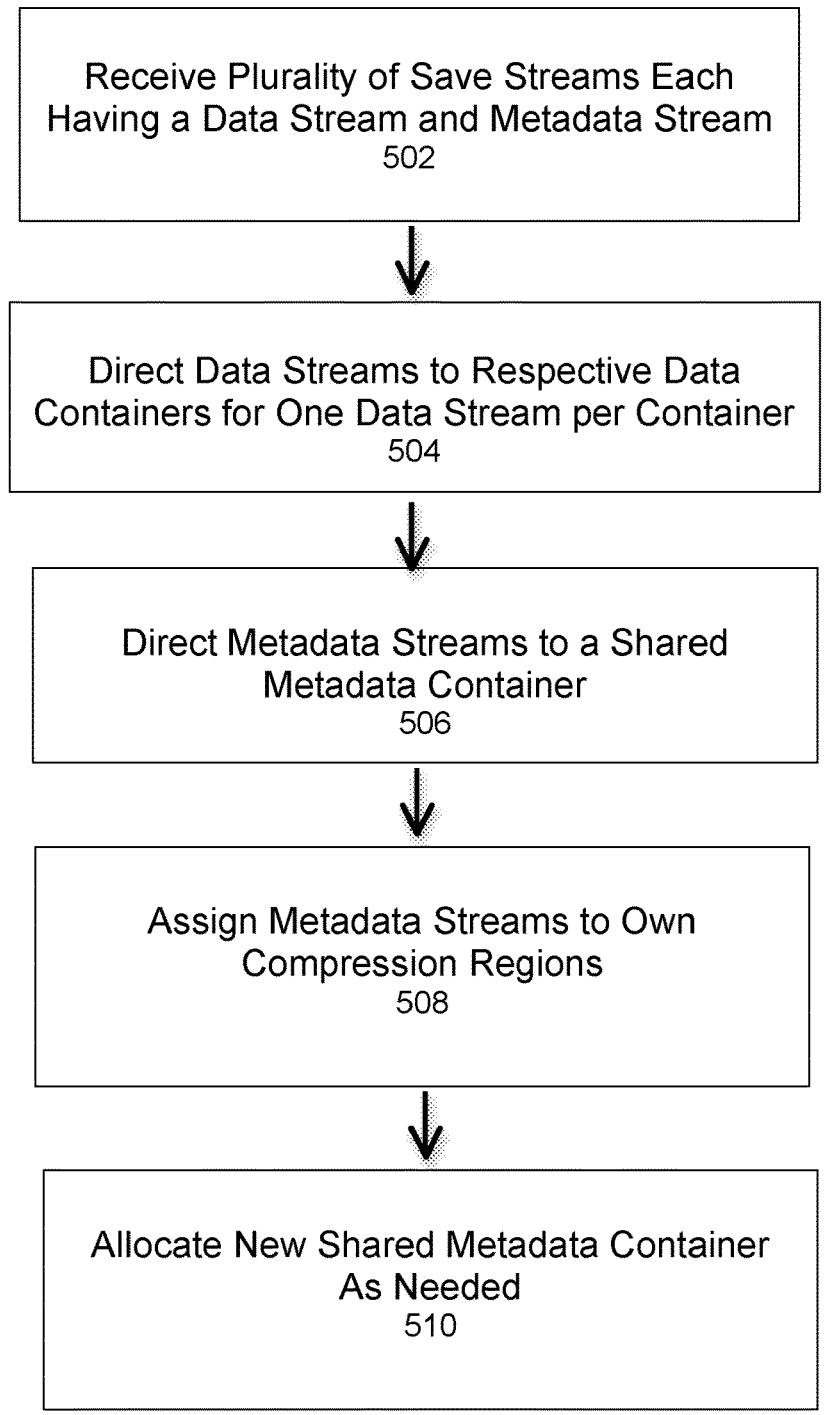
FIG. 5 is a flowchart that illustrates a method of maintaining temporal locality of save stream data using shared metadata stream containers, under some embodiments.

FIG. 5 is a flowchart that illustrates a method of maintaining temporal locality of save stream data using shared metadata stream containers, under some embodiments. As shown in FIG. 5, the process starts by receiving a number of save streams where each save stream has a data stream and a metadata stream, block 502. The data streams are each directed its own respective data containers so that individual compression regions for the data streams are kept together in a container, block 504. The metadata streams are directed to a single shared metadata container, block 506. In one embodiment, this may be performed by separating metadata streams from the data streams and multiplexing the separated metadata streams into the single shared metadata container. In another embodiment, this may be done by merging metadata containers after a certain number of metadata streams has been reached. As shown in block 508, each metadata stream that shares a metadata container gets assigned its own compression region in order to preserve locality at the compression region level, and this compression region may implemented using a page list of data pages, or other similar data structure.

When the shared metadata container capacity is exceeded, one or more additional metadata containers may be generated as needed as shown in block 510. This may be done by defining and filling the new shared container by directing the excessive metadata streams to it, as in the multiplexing case, or defining new merged metadata containers as in the merging case.

Embodiments of the stream-scaling process described herein provides a way of maintaining temporal locality while multiplexing saved data streams in a data storage system by assigning metadata streams using the shared metadata container to their own respective compression region to preserve locality at the compression region level, and maintaining a page list that correlates metadata streams in the shared container to corresponding regions. It thus provides support for compression region level locality guarantees for streams in containers, and more efficient management of NVRAM used for containers to increase stream counts.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method for preserving temporal locality in a disk-based backup system, comprising:
    receiving a plurality of save streams each comprising a data stream and a metadata stream;
    directing the data streams to a plurality of respective data containers, and the metadata streams to a single shared metadata container; and
    assigning metadata streams of the plurality of data containers to their own respective compression regions in the single shared metadata container to preserve locality at the compression region level, wherein the shared metadata container comprises a metadata page list, a compression region list, and separate page list and compression regions for the plurality of data containers as differentiated by respective save stream regions.

2. The method of claim 1 wherein metadata in each metadata stream defines references to the stored unique data segments contained in associated data stream, the method further comprising:
    keeping the single shared metadata container in a separate double-ended queue with other metadata containers;
    maintaining, for each metadata container, a count of streams that share a metadata container;
    keeping track of a number of write streams that are open; and
    using the count of streams and the number of write streams to determine an average number of streams per metadata container in order to maintain uniform sharing of metadata containers across the system using the double-ended queue.

3. The method of claim 1 wherein the containers comprise data structures stored in non-volatile RAM (NVRAM) space.

4. The method of claim 3 wherein the save streams are managed in a Stream-Informed Segment Layout (SISL) system.

5. The method of claim 1 further comprising creating a new shared metadata container when a first shared metadata container is full.

6. The method of claim 5 further comprising:
    separating the data streams from the metadata streams in each save stream; and
    combining the metadata streams in a multiplexer to direct the metadata streams to the shared metadata container.

7. The method of claim 5 further comprising:
    directing the data and metadata streams of the plurality of save streams to a first single container;
    defining a maximum number of streams contained in the single container;
    merging the metadata streams when the maximum number of streams is exceeded; and
    saving the merged metadata streams to the single shared metadata container.

8. The method of claim 1 wherein the disk-based backup system comprises a Data Domain Operating System deduplication backup system.

9. A system for preserving temporal locality in a disk-based backup system, comprising:
    an interface receiving a plurality of save streams each comprising a data stream and a metadata stream;
    a first component separating the data stream and metadata stream in each save stream into separate streams;
    a transmission component directing the data streams to a plurality of respective data containers;
    a multiplexer combining and transmitting the metadata streams to a single shared metadata container; and
    a second component assigning metadata streams of the plurality of data containers to their own respective compression regions in the single shared metadata container to preserve locality at the compression region level, wherein the shared metadata container comprises a metadata page list, a compression region list, and separate page list and compression regions for the plurality of data containers as differentiated by respective save stream regions.

10. The system of claim 9 wherein metadata in each metadata stream defines references to the stored unique data segments contained in associated data stream, the second component further keeping the single shared metadata container in a separate double-ended queue with other metadata containers; maintaining, for each metadata container, a count of streams that share a metadata container; keeping track of a number of write streams that are open; and using the count of streams and the number of write streams to determine an average number of streams per metadata container in order to maintain uniform sharing of metadata containers across the system using the double-ended queue.

11. The system of claim 10 wherein the containers comprise data structures stored in non-volatile RAM (NVRAM) space.

12. The system of claim 11 wherein the save streams are managed in a Stream-Informed Segment Layout (SISL) system.

13. The system of claim 12 further comprising a component directing the data and metadata streams of the plurality of save streams to a first single container, defining a maximum number of streams contained in the single container, merging the metadata streams when the maximum number of streams is exceeded, and saving the merged metadata streams to the single shared metadata container.

14. The method of claim 9 wherein the disk-based backup system comprises a Data Domain Operating System deduplication backup system.

15. The system of claim 12 wherein the compression region is implemented using a page list of data pages.

16. A computer program product, comprising a non-transitory computer-readable medium having a computer-readable program code embodied therein, the computer-readable program code adapted to be executed by one or more processors to perform data backups by executing instructions implementing a method comprising:
- receiving a plurality of save streams each comprising a data stream and a metadata stream;
- directing the data streams to a plurality of respective data containers, and the metadata streams to a single shared metadata container;
- maintaining a unique page list for each metadata stream; and
- assigning metadata streams of the plurality of data containers to their own respective compression regions in the single shared metadata container to preserve locality at the compression region level, wherein the shared metadata container comprises a metadata page list, a compression region list, and separate page list and compression regions for the plurality of data containers as differentiated by respective save stream regions.

* * * * *